United States Patent [19]
Funato et al.

[11] Patent Number: 5,547,783
[45] Date of Patent: Aug. 20, 1996

[54] VALVE-REGULATED LEAD-ACID BATTERY

[75] Inventors: Takayuki Funato; Katsuhiro Takahashi, both of Kyoto, Japan

[73] Assignee: Japan Storage Battery Company, Limited, Kyoto, Japan

[21] Appl. No.: 355,007

[22] Filed: Dec. 13, 1994

[30] Foreign Application Priority Data

Dec. 29, 1993 [JP] Japan .................................. 5-353461

[51] Int. Cl.$^6$ .............................. H01M 4/14; H01M 4/62
[52] U.S. Cl. ......................... 429/212; 429/225; 429/232; 429/60
[58] Field of Search ..................... 429/212, 225, 429/232, 60

[56] References Cited

U.S. PATENT DOCUMENTS

| | | | |
|---|---|---|---|
| 1,555,438 | 9/1925 | Sato | 429/225 |
| 1,667,435 | 4/1928 | Oppenheim | 429/225 |
| 3,523,041 | 8/1970 | Limbert et al. | 429/225 |
| 4,031,293 | 6/1977 | Voss et al. | 429/60 |
| 4,411,969 | 10/1983 | Sundberg | 429/60 |
| 4,473,623 | 9/1984 | Ishikura et al. | 429/60 |
| 4,939,050 | 7/1990 | Toyosawa et al. | 429/241 |
| 5,045,170 | 9/1991 | Bullock et al. | 429/225 |
| 5,156,935 | 10/1992 | Hohjo et al. | 429/232 |
| 5,223,352 | 6/1993 | Pitts et al. | 429/225 |
| 5,252,105 | 10/1993 | Witherspoon et al. | 429/225 |

FOREIGN PATENT DOCUMENTS

| | | | |
|---|---|---|---|
| 0352115 | 1/1990 | European Pat. Off. | H01M 10/06 |
| 2072929 | 10/1981 | United Kingdom | H01M 10/12 |

OTHER PUBLICATIONS

Linden, "Handbook of Batteries and Fuel Cells"; McGraw-Hill Book Company, p. 15–2 (month unknown).
Patent Abstracts of Japan, vol. 940, No. 12 (E–0000) for JP–A–6–349486 (Japan Storage Battery) 22 Dec. 1994.
Patent Abstracts of Japan, vol. 8, No. 190 (E–263) 31 Aug. 1984 & JP–A–59 079 973 (Shin Kobe).
Patent Abstracts of Japan, vol. 12, No. 69 (E–587) 3 Mar. 1988 for JP–A–62–211872 (Japan Storage Battery).

Primary Examiner—Prince Willis, Jr.
Assistant Examiner—Carol Chaney
Attorney, Agent, or Firm—Sughrue, Mion, Zinn, Macpeak & Seas

[57] ABSTRACT

The present invention provides a valve-regulated lead-acid battery in which the theoretical capacity (Ah) of the negative active material in the battery is less than that of the positive active material, the amount of a conductive additive, such as carbon, added into the negative active material is in the range of 0.5 weight % to 7.5 weight % of the negative active material, and the conductive additive is carbon, acetylene black, polyaniline, tin powder, tin compound powder, etc. having an average particle diameter of 100μ or less.

10 Claims, 2 Drawing Sheets

VALVE-REGULATED LEAD-ACID BATTERY

BACKGROUND OF THE INVENTION

1. Field of the Invention

The present invention relates to an improvement in a valve-regulated lead-acid battery.

2. Description of the Related Art

In recent years, enhancing the specific power (W/kg) and specific energy (Wh/kg) of a valve-regulated lead-acid battery and improving the life performance thereof have been urgent subjects to be developed.

In order to enhance the specific power and specific energy of the valve-regulated lead-acid battery, it is necessary to improve the discharge characteristic of the battery and reduce the weight thereof. In order to improve the discharging characteristic of the valve-regulated lead-acid battery, it is known that it is efficient to thin the positive and negative plates used for the valve-regulated lead-acid battery as well as to increase the geometrical surface area thereof and to improve the utilization of positive and negative active materials. Further, in order to decrease the weight of the valve-regulated lead-acid battery, it is considered desirable to decrease the amount of the negative active material which has comparatively little effect on the discharge characteristic of the valve-regulated lead-acid battery and to reduce the weight of the portions which do not contribute to electric power generation in the elements of the valve-regulated lead-acid battery.

However, in the case of thinning the positive plate, the life performance of the valve-regulated lead-acid battery is attenuated by corrosion of a positive electric collector.

In addition, when the porosity of the negative and positive active materials is increased in order to improve the utilization of the positive and negative active materials, the life performance becomes poor because of the deterioration of the positive and negative active materials.

Further, when the amount of the negative active material in the valve-regulated lead-acid battery is decreased so that the theoretical capacity (Ah) of the negative active material becomes less than that of the positive active material, the depth of discharge of the negative active material during discharging of the valve-regulated lead-acid battery becomes deeper than that of the positive active material. As a result, lead sulfate is generated at a greater rate in the negative active material than in the positive active material. Further, because of the gas recombinant reaction which is the greatest feature of the valve-regulated lead-acid battery, oxygen gas generated from the positive plate during charging of the battery reaches the negative plate so that the reduction reaction of the oxygen gas in the negative plate occurs more preferentially than the charging reaction in the negative plate. Consequently, it is impossible to charge the negative active material by any charging.

For these two reasons, in the valve-regulated lead-acid battery in which the theoretical capacity of the negative active material is less than that of the positive active material, sulfate is likely to be created and accumulated in the negative active material during both discharging and charging. Therefore, the negative active material deteriorates during repetition of the charging/discharging, and the life characteristic of the valve-regulated lead-acid battery becomes poor.

In addition, if the weight of electric collectors for the positive and negative which do not contribute to electric power generation in elements of the valve-regulated lead-acid battery is light, the life characteristic becomes poor because of corrosion of the collector for the positive and the deterioration of the negative active material described as follows.

The negative plate of the valve-regulated lead-acid battery includes a collector and a negative active material which is a spongy metallic lead. Accordingly, the negative active material in a completely charged state has a conductivity so that it can be discharged even when the weight of the negative collector is very small. However, lead sulfate, which is a discharging product of the negative active material, has no conductivity. Consequently, in order to charge the negative active material after discharging, a charging potential has to be applied to the negative material through the negative electric collector. Here, when the weight of the negative electric collector is small, the current density of the negative electric collector is increased. Therefore, only the negative active material at the portion in the proximity of the electric collector can be charged. Namely, the phenomenon that lead sulfate is accumulated in the negative active material occurs. This phenomenon is remarkable as the negative active material is thinned and the utilization of the negative active material is improved.

Conventionally, an electrically conductive additive such as carbon has been added to the negative active material of the lead-acid battery, regardless of whether the battery is a valve-regulated or flooded type. This tends to improve the charging property when the negative active material is charged in an unformed state. The additive is commonly added to the negative active material in an amount of 0.2 weight %. This value of 0.2 weight % is sufficient to improve the charging property when the negative active material in an unformed state is charged. Further increasing the amount of these expensive additives leads to higher cost. The flooded type lead-acid battery has a drawback that the conductive additive solves out from the negative plate into an electrolyte to make the electrolyte dirty.

Even when the amount of the conductive additive such as carbon in the negative active material in the common lead-acid battery is exceeded, as disclosed in Unexamined Japanese Patent Publication Sho. 59-79973, there is no specific performance improvement other than that in the formation characteristic of the negative plate. This is one of the reasons that the amount of the conductive additive was limited to about 0.2 weight %.

SUMMARY OF THE INVENTION

It is an object of the present invention to increase the amount of the conductive additive such as carbon which has been conventionally added to the negative active material so that the conductivity of the negative active material in a discharged state can be improved. As a result, where the theoretical capacity of the negative active material is less than that of the positive active material, or the weight of the negative electric collector is decreased, the negative active material can be charged in a complete or substantially complete state, thereby improving the life performance of the valve-regulated lead-acid battery.

A valve-regulated lead-acid battery of the present invention comprises an electrolyte including sulfuric acid; positive plates comprising a positive electric collector to which a positive active material is applied; and negative plates comprising a negative electric collector to which a negative active material is applied, the negative active material including a conductive additive; wherein a theoretical capacity (Ah: ampere-hour) of the negative active material is less than that of positive active material, and the amount of a conductive additive is in the range of 0.5 weight % to 7.5 weight % of the weight of the negative active material.

In the present invention, the amount of the additive such as carbon is increased in the negative active material of the valve-regulated lead-acid battery in which the theoretical capacity of the negative active material is less than that of the positive active material so that the polarization in the negative plate is decreased, whereby the charging reaction of the negative active material occurs more preferentially than the reduction reaction of oxygen gas. Further, the negative active material includes a large amount of conductive additive such as carbon having higher conductivity than lead sulfate generated when the negative active material is discharged so that charging of the lead sulfate can be easily carried out. For these two reasons, accumulation of the lead sulfate in the negative active material is restrained, and the life performance of the valve-regulated lead-acid battery can be improved remarkably. Moreover, the weight of the negative electric collector in the valve-regulated lead-acid battery, which conventionally required a large weight, can be decreased. Thus, the valve-regulated lead-acid battery is made lightweight so that the specific power and specific energy of the valve-regulated lead-acid battery can be enhanced without impairing the life performance.

DESCRIPTION OF THE PREFERRED EMBODIMENTS

The preferred embodiments of the present invention will be described referring to the accompanying drawings as follows.

Figure 3A:
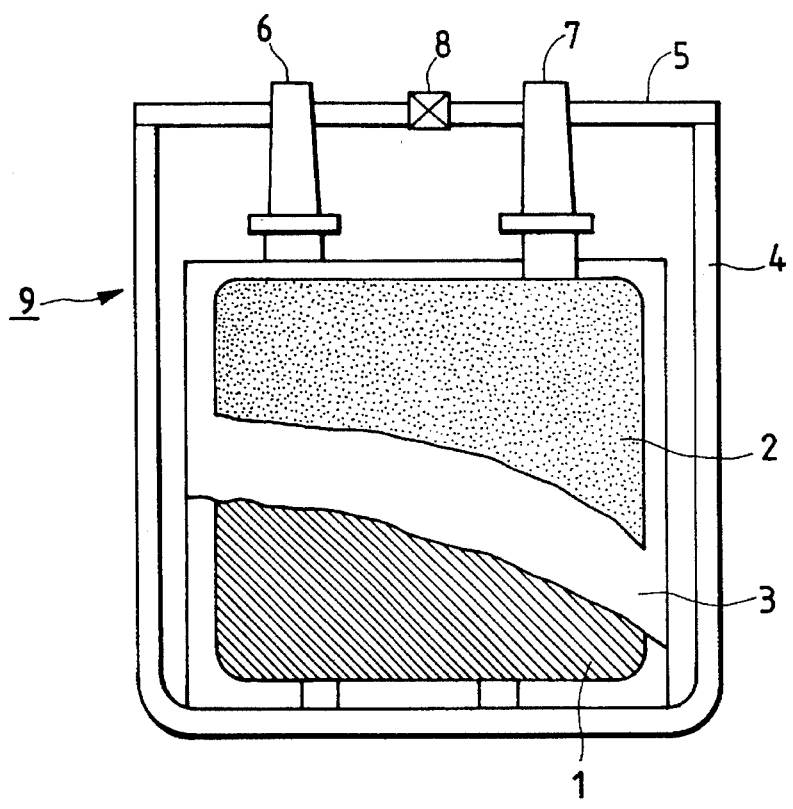
FIG. 3A is a sectional view showing an example of a valve-regulated lead-acid battery.
Figure 3B:
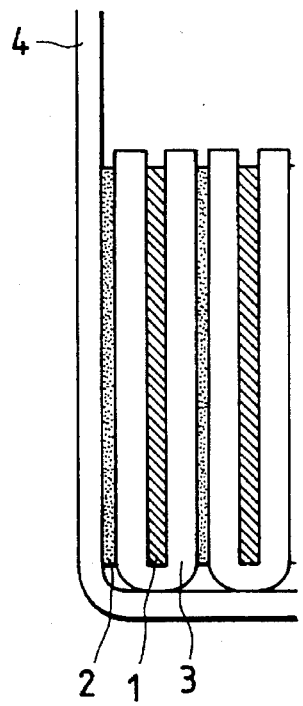
FIG. 3B is a cross sectional view showing an example of a valve-regulated lead-acid battery.

FIG. 3A is a sectional view and FIG. 3B is a cross sectional view showing an example of a valve-regulated lead-acid battery 9. The valve-regulated lead-acid battery includes positive plates 1, negative plates 2, a battery jar 4, a battery jar cover 5 and safety valve 8 for exhausting gases to the outside. Separators 3 are provided between the positive plate 1 and negative plate 2. A positive terminal 6 and a negative terminal 7 are connected to the positive plates 1 and negative plates 2, respectively, so that their top end portions project to the outside of the battery 9. Dilute sulfuric acid is poured into the battery jar 4.

Figure 4:
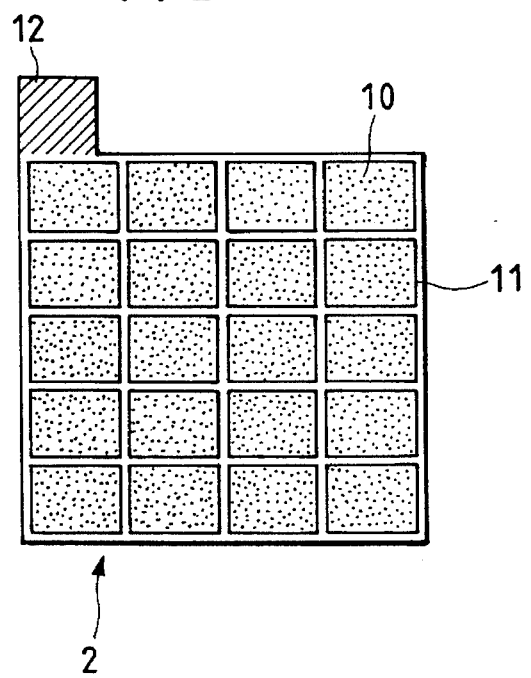
FIG. 4 is a plan view showing an example of a negative electric collector.

FIG. 4 shows an example of negative plate 2, which is constructed of a negative active material 10 and an electric collector including a grid-like shape portion 11 and a lug 12. The negative active material can be, for example, a paste made by mixing and kneading lead powder, additives such as a small amount of carbon, barium sulfate, lignin and dilute sulfuric acid. The negative active material is filled into the grid-like shape portion 11 of the negative plate 2.

Similarly, the positive plate 1 is constructed of a positive active material and an electric collector including a grid-like shape portion and a lug. The positive active material can be, for example, a paste made by mixing and kneading lead powder, red lead and dilute sulfuric acid. The positive active material is filled into the grid-like shape portion of the positive plate.

EXAMPLE 1

Two positive plates, three negative plates, micro glass fiber separators and the like were combined, and dilute sulfuric acid was poured into the combination to form a so-called retainer type valve-regulated lead-acid battery (five-hour rate nominal capacity is 25 Ah, nominal voltage is 2 V: hereinafter referred to as a valve-regulated lead-acid battery A). In this battery, each of the positive plates made a grid-like electric collector having a width of 100 mm, a height of 180 mm and a thickness of 3 mm. A paste (positive active material) which was made by mixing and kneading lead powder, red lead and dilute sulfuric acid was filled into the grid portion. Each of the negative plates made a grid-like electric collector having a width of 100 mm, a height of 180 mm and a thickness of 2 mm. A paste (negative active material) made by mixing and kneading lead powder, additives such as a small amount of carbon, barium sulfate, lignin and dilute sulfuric acid was filled into the grid portion.

The thickness of the negative electric collectors of the valve-regulated lead-acid battery was varied to manufacture four kinds of retainer type valve-regulated lead-acid batteries with different amounts of negative active material. On the other hand, each positive electric collector used for these four kinds of batteries was the same. Also, the positive active material applied to each positive electric collector was the same. Four ratios (01.28, 1.07, 0.98, 0.70) of the theoretical capacity of the negative active material to that of the positive active material were adopted. The theoretical capacity (Ah) of the negative active material is a value which is obtained by dividing the amount (g) of the negative active material by 3.866 (g/Ah), whereas the theoretical capacity (Ah) of the positive active material is a value which is obtained by dividing the amount (g) of the positive active material by 4.463 (g/Ah).

These four kinds of retainer type valve-regulated lead-acid battery were subjected to a charging/discharging cycle life test in which they were discharged to 1.8 V at 0.2 CA (5A), and thereafter charged 120% of the discharged amount by a constant current of 0.1 CA (2.5 A). In this test, the life was represented by the time when the capacity at 0.2 CA discharge reaches 80% of the nominal capacity.

Figure 1:
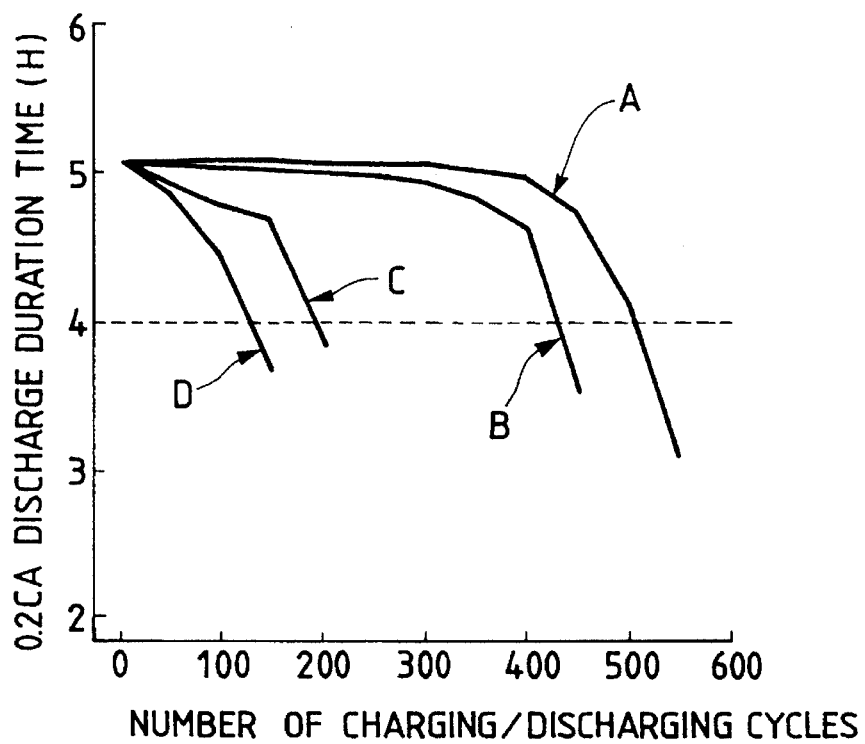
FIG. 1 is a graph showing an example of the result of the charging/discharging cycle life test.

FIG. 1 shows the result of the test. In FIG. 1, the ordinate indicates a 0.2 CA (5A) discharge duration time, whereas the abscissa indicates the number of charging/discharging cycles. Symbols A, B, C and D correspond to the valve-regulated lead-acid batteries having ratios of 1.28, 1.07, 0.98 and 0.70 of the negative theoretical capacity to the positive theoretical capacity, respectively.

As seen from FIG. 1, the battery of symbol A having the ratio of 1.28 had the best transition of its capacity. The transition became worse in the order of the battery of symbol B having a ratio of 1.07, the battery of symbol C having a ratio of 0.98 and the battery of symbol D having the ratio of 0.70. The batteries of symbols C and D in which the theoretical capacity of the negative active material was less than that of the positive active material became extremely poor.

After the four kinds of valve-regulated lead-acid batteries shown in FIG. 1 reached the end of their life, they were disassembled to investigate the cause of the capacity drop. In the batteries of symbols A and B, the cause of failure was corrosion of the positive electric collector and deterioration of the negative active material. On the other hand, in the batteries of symbols C and D, the cause of capacity drop was that a large amount of lead sulfate (symbol C: 44% and symbol D: 52%) was accumulated in the negative active material.

Therefore, it was clarified that the cause of capacity drop is due to the accumulation of lead sulfate in the negative active material, resulting in deterioration of the negative active material, if the ratio of the theoretical capacity of the negative active material to that of the positive active material is smaller than 1.0.

In order to improve the life characteristic of the valve-regulated lead-acid battery in which the ratio of the theoretical capacity of the negative active material to that of the positive active material is smaller than 1.0, conductive additives such as carbon and additives such as barium and lignin to be added into the negative active material were examined. As a result, it was found that varying the amount of the conductive material such as carbon to be added into the negative active material has a remarkable effect on the improvement of the life performance.

Figure 2:
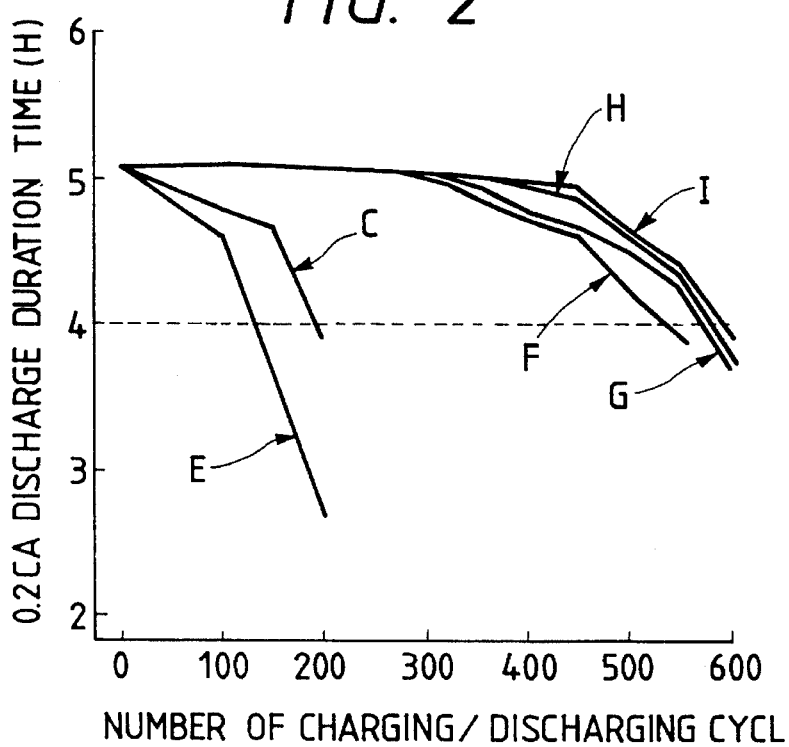
FIG. 2 is a graph showing another example of the result of the charging/discharging cycle life test.

An example of the test results is shown in FIG. 2. FIG. 2 shows the transition of capacity in the same charge/discharge cycle life test as in FIG. 1 for a valve-regulated lead-acid battery using a negative active material in which the amount of the conductive additive to be added into the negative active material was varied from 0.1 weight % to 7.5 weight % of the weight of the negative active material in the valve-regulated lead-acid battery. The battery had a ratio of the theoretical capacity of the negative active material to that of the positive active material of 0.98. In FIG. 2, symbols C, E, F, G, H, and I correspond to the valve-regulated lead-acid batteries using negative active materials in which the amounts of the conductive additive in the negative active material were 0.2 weight % (which was the same amount as used in the testing for FIG. 1), 0.1 weight %, 0.5 weight %, 1.0 weight %, 3.5 weight % and 7.5 weight % of the weight of the negative active material, respectively.

As seen from FIG. 2, where the amount of conductive additive such as carbon was 0.2 weight % or less, there was no significant improvement in the capacity transition characteristic. Where it was 0.5 weight % or more, the capacity transition was improved remarkably. This is because the accumulation of lead sulfate in the negative active material could be suppressed for the following reasons. First, the increment of the amount of conductive additives decreases the polarization of the negative active material so that the charging reaction of the negative active material occurs more preferentially than the reduction reaction of oxygen gas (gas recombination reaction). Second, the presence of a large amount of the additive having higher conductivity than that of lead sulfate generated when the negative active material is discharged improves the conductivity around the lead sulfate which is a discharging product of the negative active material. The effect is remarkable in the case where the theoretical capacity of the negative active material is smaller than that of the positive active material. However, in the case where the theoretical capacity of the positive active material is larger than that of the negative active material, no specific improvement occurs in the capacity transition.

In this case, the amount of the conductive additive should be limited to less than or equal to 7.5 weight % of the amount of the negative active material. This is because when the amount of the conductive additive exceeds 7.5 weight %, it becomes difficult to knead paste. Also, the amount of the additive in the negative active material becomes excessive so that the amount of the active material itself decreases to reduce the capacity, and the shedding of the negative material from the negative electric collector occurs to deteriorate handling.

Further, in several kinds of valve-regulated lead-acid batteries in which the ratio of the theoretical capacity is smaller than 0.98, tests in which the amount of the conductive additive such as carbon were varied was carried out. In all cases, substantially the same tendency as the above result was exhibited.

EXAMPLE 2

The thickness of the negative electric collector and the shape of the grid thereof in the valve-regulated lead-acid battery A were varied to manufacture retainer type valve-regulated lead-acid batteries in which the ratio of the negative active material to that of the positive active material was 0.98, the amount of the additive such as carbon to be added into the negative active material was 0.5 weight % of the weight of the negative active material and the weight ratio of the negative electric collector for the negative active material was varied in several values ranging from 0.08 to 1.0.

These valve-regulated lead-acid batteries were subjected to the charging/discharging cycle life test described in Example 1. Irrespective of the weight of the negative electric collector to that of the negative active material, the same effect as in Example 1 resulted. Particularly, in the case where the weight ratio of the negative electric collector to that of the negative active material was 0.4 or less, the effect was remarkable even though the valve-regulated lead-acid battery reached its life earlier, when the amount of the conductive additive such as carbon was 0.2 weight % or so as in the prior art. Even in this case, when a large amount of the conductive additive was added, the same effect as when the ratio of the weight of the negative electric collector to that of the negative active material was 0.4 or more was obtained. In this case, the weight of the negative electric collector did not include a lug of the negative electric collector, i.e., it included merely the grid-like portion of the electric collector.

Further, with respect to several kinds of valve-regulated lead-acid batteries in which the ratio of the theoretical capacity of the negative active material to that of the positive active material was smaller than 0.98, and the amount of the conductive additive was 0.5 weight % or more of that of the negative active material, tests with the weight of the negative electric collector varied with respect to that of the negative active material were carried out. In all tests, substantially the same tendency as in the above result was obtained.

EXAMPLE 3

Next, the amount of electrolyte (sulfuric acid) was examined. In the valve-regulated lead-acid battery A, several kinds of valve-regulated lead-acid batteries were fabricated in which the theoretical capacity of the negative active material to that of the positive active material was 1.0 or less, and the amount of the conductive additive such as carbon in the negative active material was 0.5 weight % to 7.5 weight % of the amount of the negative active material.

For each of the batteries, the specific gravity and amount of the electrolyte were changed. Then, the specific gravity and amount of the electrolyte were set so that the ratio of the theoretical capacity of the electrolyte to that of the negative active material was 1.30, 1.05, 0.95 or 0.70. With respect to the valve-regulated lead-acid batteries thus fabricated, the same charging/discharging life test as in Example 1 was carried out.

As a result, in any case where the ratio the theoretical capacity of the electrolyte to that of the negative active material was smaller than 1.0, a great improvement in the life performance was obtained. The reason may be that where the ratio of the theoretical capacity of the electrolyte to that of the negative active material is 1.0 or larger, the capacity of the valve-regulated lead-acid battery is limited by that of the negative active material so that the negative active material is discharged to the maximum degree, whereas where the ratio of the theoretical capacity of the electrolyte to that of the negative active material is smaller than 1.0, the capacity of the valve-regulated lead-acid is limited by the capacity of the electrolyte so that the discharging depth of the negative active material becomes shallow and hence the battery is placed in the condition where the negative active material is easily completely charged.

EXAMPLE 4

The conductive additive to be added was examined. In the valve-regulated lead-acid battery A, several kinds of valve-regulated lead-acid batteries were fabricated in which the theoretical capacity of the negative active material to that of the positive active material was 0.98, and the amount of the conductive additive to be added into the negative active material was 0.5 weight % of the weight of the negative active material. With the kind of the conductive additive changed, with respect to the valve-regulated lead-acid batteries thus fabricated, the same charging/discharging life test as in Example 1 was carried out. In any case, an improvement in the life performance was obtained. In particular, a remarkable effect was obtained when carbon with an average particle diameter of 100 μ or less was added. The reason why the remarkable effect was given on the improvement of the life performance is considered to be that carbon is likely to be dispersed when negative paste is kneaded, and is dispersed more uniformly in the negative active material when the average particle diameter is 100μ or less.

As to the kinds of carbon, the effect of acetylene black was excellent. The effect of carbon having a higher conductivity than acetylene black or of carbon having a smaller average particle diameter than acetylene black was even more excellent.

Further, as regards conductive additives other than carbon, when polyaniline, tin (Sn) powder or tin compound was added, the same effect was obtained as when acetylene black was added.

In several kinds of valve-regulated lead-acid batteries in which the ratio of the theoretical capacity of the negative active material to that of the positive active material was smaller than 0.98, several kinds of conductive additives were examined. In any case, substantially the same tendency as in the above result was obtained.

EXAMPLE 5

In the valve-regulated lead-acid battery A in which the ratio of the negative active material to that of the positive active material was 0.98, and the amount of the acetylene black to be added into the negative active material was 0.5 weight % of the weight of the negative active material, the composition of an alloy of the negative electric collector was examined.

Generally, an alloy of the lead-calcium family or the lead-antimony family may be used in lead-acid batteries. Valve-regulated lead-acid batteries using the lead-calcium family alloy and the lead-antimony one were manufactured. With respect to these batteries, the same charging/discharging cycle life test as in Example 1 was carried out.

As a result, in the battery using the collectors of lead-calcium alloy, the life performance was improved. On the other hand, in the battery using the lead-antimony alloy, the effect was slight. This is because the lead-antimony alloy, having a smaller hydrogen over voltage than the lead-calcium alloy hydrogen over voltage, easily generates hydrogen, i.e., the charging current is used to generate hydrogen, thereby reducing the charging efficiency of the negative active material.

In Examples 1 to 5 hitherto described, the embodiments of the present invention were explained in connection with the retainer type valve-regulated lead-acid battery. The effect of the present invention was also obtained in gelled type valve-regulated lead-acid batteries and a granular silica retainer type lead-acid battery, which is a new system of the valve-regulated lead-acid battery. However, in the conventional flooded-type lead-acid battery, the effect of the present invention could not be obtained, because the gas recombinant reaction does not occur and the negative plate can be easily charged in almost all cases.

In accordance with the present invention, the life performance of valve-regulated lead-acid batteries can be greatly improved, and thus the industrial value of the present invention is very great.

What is claimed is:

1. A valve-regulated lead-acid battery comprising:

an electrolyte including sulfuric acid;

a battery jar which includes said electrolyte therein;

a positive plate including a positive electric collector which is filled with a positive active material; and a negative plate including a negative electric collector which is filled with a negative active material, said negative active material including a conductive additive;

wherein a theoretical capacity (Ah: ampere-hour) of said negative active material is less than that of said positive active material in said valve-regulated lead-acid battery, and the amount of said conductive additive in said negative active material is in the range of 0.5 weight % to 7.5 weight % of the amount of the negative active material;

wherein said conductive additive is selected from the group consisting of carbon black, polyaniline, powdered tin, and a powdered tin compound.

2. A valve-regulated lead-acid battery according to claim 1, wherein a weight of said electric collector except a lug of said negative electric collector is 0.4 or less times as large as the weight of said negative active material.

3. A valve-regulated lead-acid battery according to claim 1, wherein a theoretical capacity (Ah) of the sulfuric acid ($H_2SO_4$) in said valve-regulated lead acid battery is less than that of the negative active material.

4. A valve-regulated lead-acid battery according to claim 1, wherein said conductive additive added comprises carbon black having an average particle diameter of 100 μ or less.

5. A valve-regulated lead-acid battery according to claim 1, wherein said conductive additive comprises acetylene black.

6. A valve-regulated lead-acid battery according to claim 1, wherein said conductive additive comprises carbon black having a higher conductivity than that of acetylene black.

7. A valve-regulated lead-acid battery according to claim 1, wherein said conductive additive comprises carbon black having a smaller average particle diameter than that of the acetylene black.

8. A valve-regulated lead-acid battery according to claim 1, wherein said conductive additive comprises polyaniline.

9. A valve-regulated lead-acid battery according to claim 1, wherein said conductive additive comprises at least one of powdered tin and a powdered tin compound.

10. A valve-regulated lead-acid battery according to claim 1, wherein a negative electric collector comprises a lead alloy which is substantially free from antimony.

* * * * *